Figure 1:
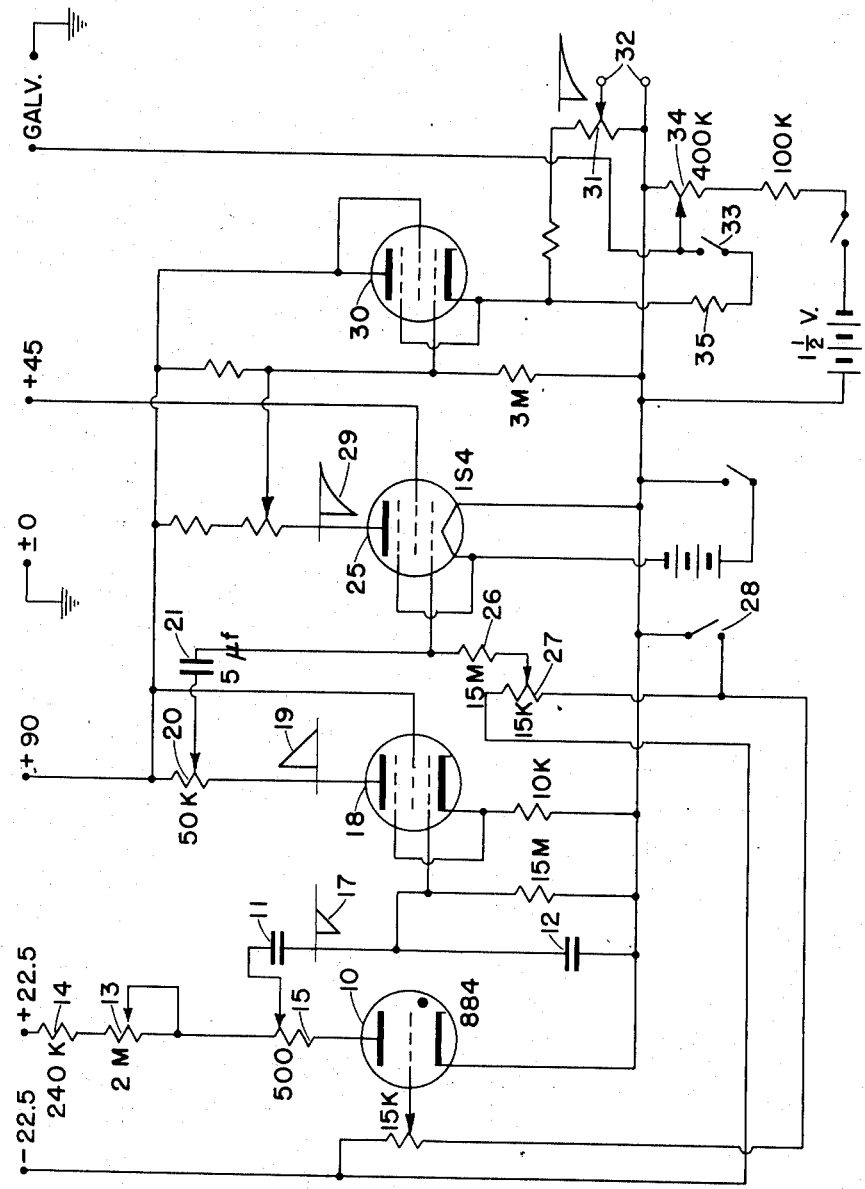

Oct. 6, 1953 C. E. WIEGAND 2,654,840
PULSE GENERATOR
Filed Sept. 1, 1950 2 Sheets-Sheet 1

WITNESSES:

INVENTOR:
CLYDE E. WIEGAND
BY

A

B

C

Patented Oct. 6, 1953

2,654,840

UNITED STATES PATENT OFFICE 2,654,840

PULSE GENERATOR

Clyde E. Wiegand, Oakland, Calif., assignor to the United States of America as represented by the United States Atomic Energy Commission Application September 1, 1950, Serial No. 182,851

1 Claim. (Cl. 250—27)

This invention relates to an electric pulse generator and, more particularly, to an electronic generator of pulses having a substantially instantaneous rise time and a hyperbolic decay time.

Situations occur in which it is necessary to generate pulses having a leading edge of substantially vertical rise and a trailing edge having a decaying amplitude equal to the reciprocal of the time lapse from the peak value. For example, the pulses derived from discharges in an ionizable medium have the shape described, and it is necessary in designing electronic equipment for response to such pulses that a controllable source of pulses which simulate the ionization discharge shape be available.

The present invention, for this purpose, modifies a linearly decaying pulse of the sawtooth shape to the hyperbolic decay shape. Briefly, the invention comprises a sawtooth pulse generator of the gas relaxation type. The sawtooth pulses are inverted in the usual manner and the resulting positive sawtooth pulse is impressed on the grid of a thermionic tube adjusted to operate on the hyperbolic part of its characteristic. The hyperbolic output pulses present on the anode of the thermionic tube are impressed on a cathode follower so that the critically biassed thermionic tube is decoupled from the load and the pulses of desired shape are available from a low impedance source.

Therefore, it is an object of this invention to provide an apparatus for generating electric impulses having a substantially vertical lead edge and a trailing edge having an $l/t$ characteristic.

It is another object of the invention to provide a simple, reliable combination of parts to accomplish the first object.

Other objects of the invention will become apparent as the description proceeds with reference to the following specification and the accompanying drawings made a part thereof.

Figure 2:
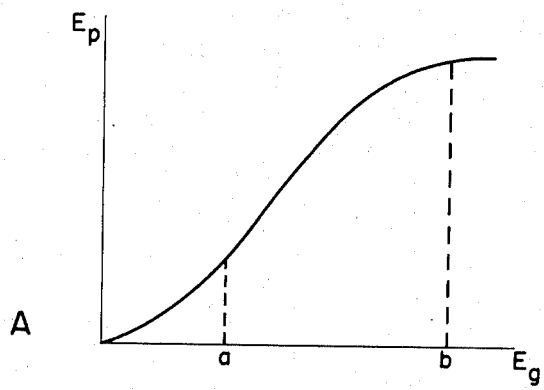
Figure 2:
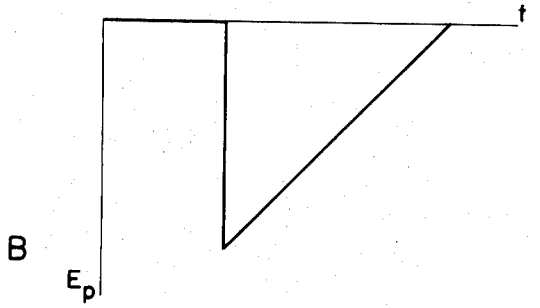
Figure 2:
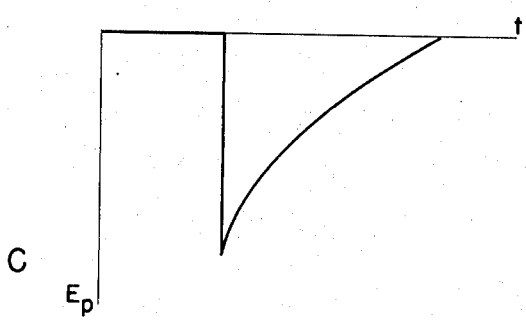

In the drawings:

Figure 1 is a schematic diagram of a pulse generator in accordance with the invention, and Figure 2 is a set of graphs useful in explaining the parts in combination of Figure 1.

Referring to Figure 1, the hyperbolic impulse generator comprises, essentially, four stages. These are the sawtooth generator, the phase inverter, the hyperbolic modifier, and a buffer amplifier.

The sawtooth generator can be any one of the known types and for purposes of illustration is shown as a gas triode relaxation oscillator. The sawtooth generator comprises gas triode 10 having discharge potential storage capacitors 11 and 12 and series resistors 13 and 14. Resistor 13 is adjustable to admit of control of the sawtooth wave slope. Resistor 15 is for the purpose of protecting the gas triode against excess discharge current and is therefore of low ohmic value.

The sawtooth wave shown at 17 is coupled from the junction of serially connected capacitors 11 and 12 to the grid of phase inverter tube 18. The wave then appears in the anode circuit of the inverter tube as shown at 19. The phase inverter tube is connected to a source of anode potential through a potentiometer type rheostat 20. The slider of rheostat 20 couples the positive sawtooth pulse through condenser 21 to the grid of thermionic tube 25.

Tube 25 is provided with anode and grid potentials such that its plate versus grid characteristic is hyperbolic. To this end, the grid of tube 25 is provided with a grid resistor 26 and bias adjusting potentiometer 27. One end of the rheostat resistance is at a selected negative potential and the other end is connected to zero or common ground potential through switch 28. The switch 28 serves the additional purpose of activating the relaxation oscillator.

Referring to Figure 2, curve A shows the characteristic of plate current versus grid potential of tube 25, the grid bias of which is so adjusted as to give a substantially hyperbolic curve in the zone $a$—$b$. For tube type 1S4, this zone extends from $-10$ to $-20$ volts on the grid. Curve B is the sawtooth potential impressed on the grid of inverter tube 18 and curve C shows the hyperbolic impulse output on the anode of tube 25 due to the impression thereon of the potential of curve B after inversion in tube 18.

Referring again to Figure 1, the output hyperbolic impulse of tube 25 is shown at 29 and is coupled to a buffer amplifying cathode-follower tube 30. Adjustable attenuator 31 is provided in the cathode circuit of this tube to permit pulses of adjustable amplitude to be taken off of output terminals 32.

It has been found to be advantageous to provide facilities to measure the pulse amplitude output on a galvanometer-type instrument. To this end, a connection indicated on the drawing as "galv" is connected to the cathode of tube 30 through switch 33 and series resistor 35. The static cathode D. C. potential is balanced by the potential taken off potentiometer 34 in order to permit calibration of the galvanometer.

For purposes of facilitating the application of this invention to practical apparatus, certain critical values of parts are shown on the drawing. It is to be understood that such values are shown by way of example only and that the invention is not limited to the type of tubes and values of parts specified. Other tubes and values of parts will occur to those skilled in the art suitable for obtaining the results desired in accordance with the principles herein set forth.

What is claimed is:

An impulse generator comprising a gaseous triode relaxation oscillator, a phase inverter, a hyperbolic translator and a cathode follower, said gaseous triode relaxation oscillator being adapted to generate negative sawtooth impulses, means electrically coupling the sawtooth oscillator to the phase inverter to thereby produce positive sawtooth impulses, said hyperbolic translator being a thermionic tube having at least a cathode, grid and anode, a source of adjustable bias, means for electrically impressing said bias on the grid-cathode circuit of said translator and adjusting the value to give an $E_p$-$E_g$ characteristic of hyperbolic form, means for electrically injecting said positive sawtooth impulses serially in the translator cathode-grid circuit, means electrically coupling the grid-cathode circuit of the cathode follower in shunt substantially with the anode-cathode interelectrode space of the translator tube, and terminal means connected to the cathode-follower output.

CLYDE E. WIEGAND.

References Cited in the file of this patent

UNITED STATES PATENTS

| Number | Name | Date |
|---|---|---|
| 2,271,876 | Seeley | Feb. 3, 1942 |
| 2,401,404 | Bedford | June 4, 1946 |
| 2,428,541 | Bagley | Oct. 7, 1947 |
| 2,441,387 | Berger et al. | May 11, 1948 |
| 2,455,283 | Valley, Jr. | Nov. 30, 1948 |
| 2,485,938 | Talbott et al. | Oct. 25, 1949 |
| 2,508,879 | Zagor | May 23, 1950 |